United States Patent [19]
Gibbon et al.

[11] Patent Number: 5,874,986
[45] Date of Patent: Feb. 23, 1999

[54] METHOD FOR COMMUNICATING AUDIOVISUAL PROGRAMS OVER A COMMUNICATIONS NETWORK

[75] Inventors: David Crawford Gibbon, Lincroft; Robert Edward Markowitz, Glen Rock; Behzad Shahraray, Freehold; Steven David Simon, Middletown, all of N.J.

[73] Assignee: AT&T Corp, Middletown, N.J.

[21] Appl. No.: 670,924

[22] Filed: Jun. 26, 1996

[51] Int. Cl.⁶ .................................................. H04N 7/14
[52] U.S. Cl. .................... 348/13; 348/7; 348/10; 370/335; 455/4.2
[58] Field of Search ................. 348/13, 719, 10, 348/7, 12, 460; 340/825.31; 364/514 R, 514; 370/62, 335; 395/157, 600; 385/341; 455/4.2; H04N 7/14

[56] References Cited

U.S. PATENT DOCUMENTS

| | | | |
|---|---|---|---|
| 4,647,985 | 3/1987 | Yokosawa | 385/341 |
| 5,172,111 | 12/1992 | Olivo, Jr. | 340/825.31 |
| 5,428,774 | 6/1995 | Takahashi et al. | 395/600 |
| 5,440,336 | 8/1995 | Buhro et al. | 348/13 |
| 5,471,577 | 11/1995 | Lightbody et al. | 395/157 |
| 5,481,296 | 1/1996 | Cragun et al. | 348/13 |
| 5,486,876 | 1/1996 | Lew et al. | 348/719 |
| 5,521,841 | 5/1996 | Arman et al. | 364/514 |
| 5,621,729 | 4/1997 | Johnson et al. | 370/62 |
| 5,636,139 | 6/1997 | McLaughlin et al. | 364/514 R |
| 5,668,805 | 9/1997 | Yoshinobu | 370/335 |
| 5,673,430 | 9/1997 | Story | 455/4.2 |
| 5,675,738 | 10/1997 | Suzuki et al. | 395/200.09 |
| 5,790,198 | 8/1998 | Roop et al. | 348/460 |

*Primary Examiner*—Tommy P. Chin
*Assistant Examiner*—Gims S. Philippe

[57] ABSTRACT

Audiovisual programs are transmitted over a low-bandwidth network in a compressed form in which the number of video frames has been reduced by selecting "significant" frames. The user sees a series of still images accompanying an apparently full audio channel. The frames are downloaded to the user in an order designed to assure, first, that the next few frames necessary for viewing are present, but also so that the user can scroll throughout the program even as it is being downloaded. This is accomplished by first downloading the full audio for the program portion requested by the user's viewer software, and then downloading the video frames based on requests from the viewer software, which has access to a table indicating which video frames are associated with which audio portions. The software uses the table to download frames needed immediately, as well as to download advance frames based on their significance.

20 Claims, 7 Drawing Sheets

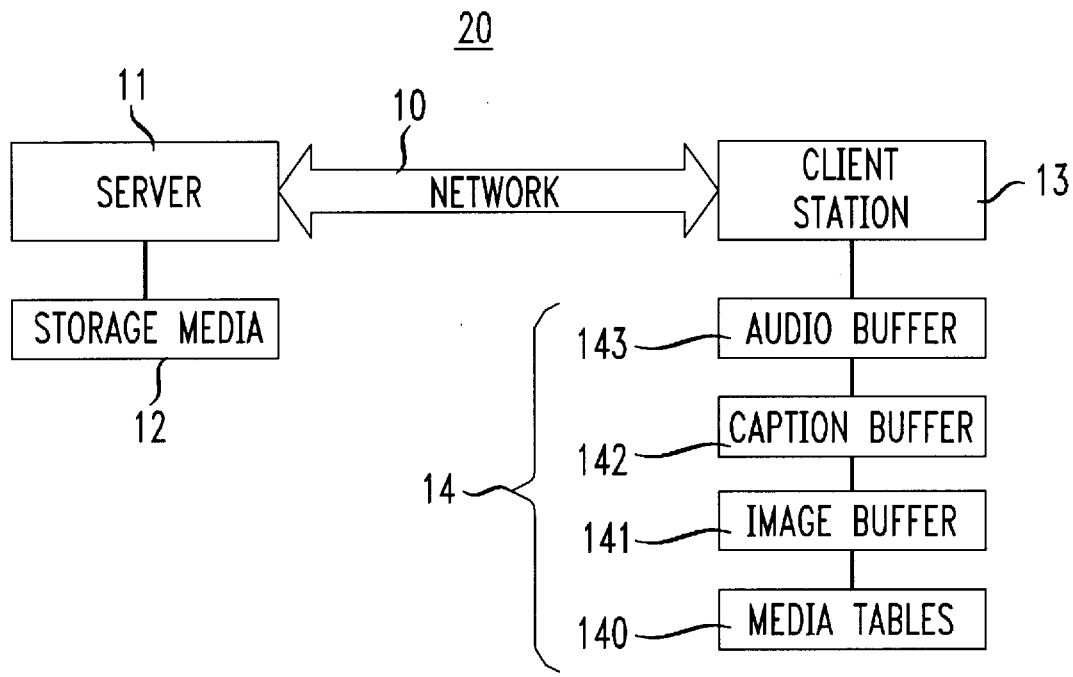

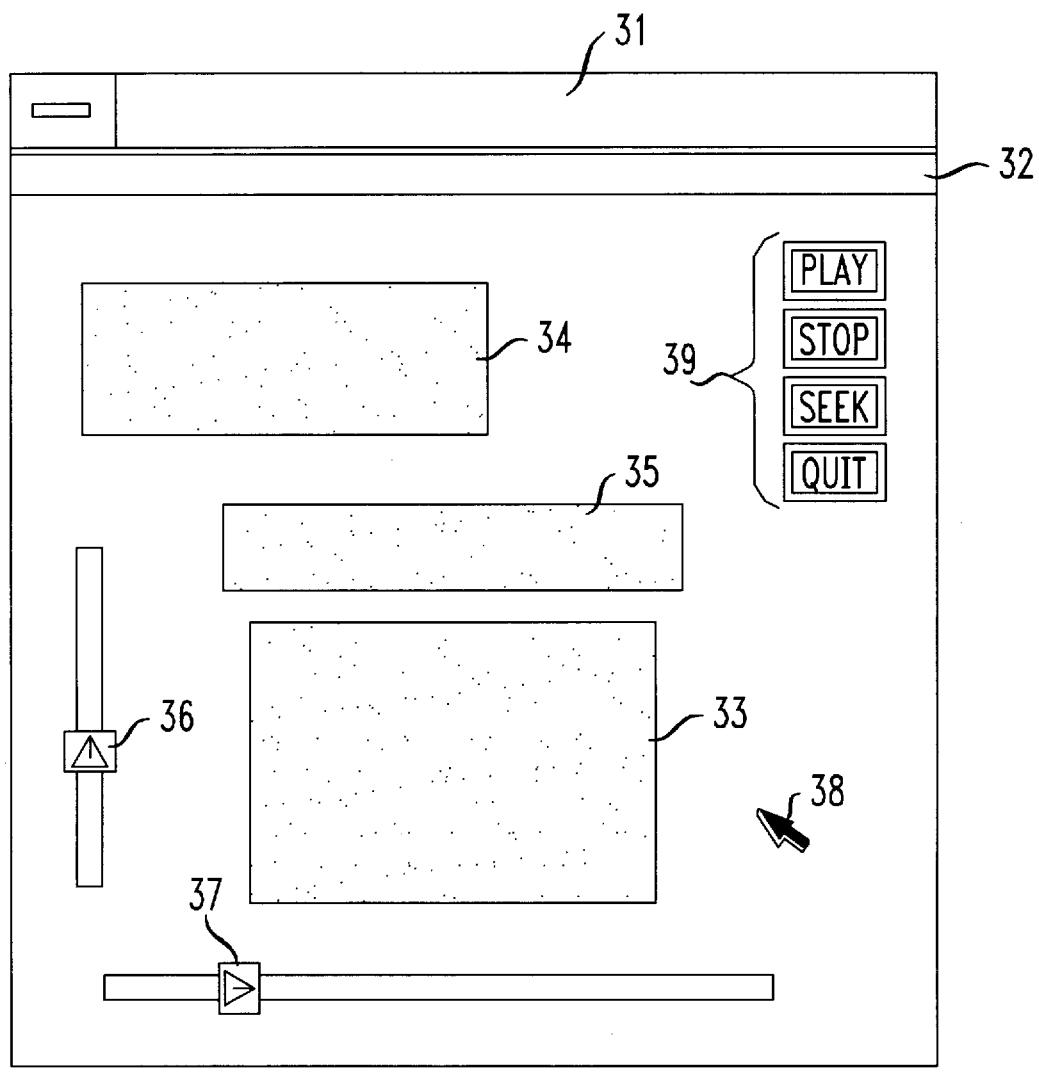

METHOD FOR COMMUNICATING AUDIOVISUAL PROGRAMS OVER A COMMUNICATIONS NETWORK

This application is co-pending with U.S. patent application Ser. No. 08/672123, filed on Jun. 27, 1996.

Background of the Invention

This invention relates to the transmission of transmissions having relatively high bandwidth requirements, such as audiovisual programs. More particularly, this invention relates to a method for transmitting such programs using a content-based compression scheme and viewing such compressed programs.

With the increasing popularity of on-line computer networks, such as the Internet, it has become increasingly common to transmit audiovisual programs, such as movies or television programs, over such networks. However, because of the limited bandwidth of such networks, and particularly the limitations of most users' connections to the network, it takes a long time to transmit a program with its full content. For example, at a connection speed of 28,800 bits per second, it could take up to about 45 minutes to transmit even a three- or four-minute audiovisual segment with sound and full-motion video.

Various compression techniques are used to attempt to reduce the amount of data to be transmitted in connection with audiovisual programs, but most such techniques have to date produced less than satisfactory results. The majority of the data is found in the video portion of the program, and thus efforts have focused there. In addition, it has been observed that users tend to be more forgiving of quality deficiencies caused by video compression than those caused by audio compression; users expect audio to be substantially perfect.

Some techniques for compressing the video portion attempt to reduce the amount of data sent for each frame, but that may result in a loss of sharpness or detail. Other techniques compare each frame to the previous frame and only transmit the changes from one frame to the next. Still other techniques drop certain frames completely, frequently based solely on a fixed interval—i.e., every nth frame is dropped, regardless of its content and its relationship to adjacent frames. This last technique results in video having a "jerky" appearance. And still, none of these techniques allows fast enough transmission to allow the user to watch the program in real time, or at least to begin watching the beginning of the program while the remainder is downloaded, or to scroll through the program in any reasonable way before it is completely downloaded.

More recently, a compression technique based on selecting video frames as a function of their content has been described in copending U.S. patent application No. 08/252,861, filed Jun. 2, 1994, which is hereby incorporated by reference in its entirety. In that technique, certain frames are extracted automatically based on their content and are retained, while the remaining frames are discarded. For example, scene changes, fade-outs, and volume changes in the associated audio channel could be used to indicate important frames. Those frames would be retained while others would be discarded. The only exception might be a program involving a lot of action, which would have many scene changes resulting in more "significant" frames than could be transmitted, so that even some of the "significant" frames would have to be discarded.

However, it is still necessary, when using such a compression scheme as described, to download the complete compressed program before one can view the program other than in real time. No technique has been described for viewing programs so compressed, as they are being downloaded, with the ability to scroll throughout the program before downloading is completed.

It would be desirable to be able to provide a technique for viewing compressed audiovisual programs, as they are being transmitted, while allowing the user to scroll through the entire program before downloading is completed.

SUMMARY OF THE INVENTION

It is an object of this invention to provide a technique for viewing compressed audiovisual programs, as they are being transmitted, while allowing the user to scroll through the entire program before downloading is completed.

In accordance with this invention, there is provided a method for receiving an audiovisual program at a station of a communications network and playing back the program at the station. The method is used with an audiovisual program having content comprising a video data stream and at least one other data stream, where the video data stream is transmitted in a compressed format in which frames determined to have greater significance than other frames are retained and frames determined to have lesser significance than other frames are discarded, the program further being accompanied by a table indicating which frames are present in the compressed program and a time offset at which display of each frame is to begin. The method includes establishing a pre-fetch interval. Next, at the station, a request is made for transmission by the network of data to fill a pre-fetch queue having a duration commensurate with the pre-fetch interval. When the pre-fetch queue is full, there is a request, at the station, for transmission by the network of additional data from later portions of the program.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 1 is a schematic diagram of a client/server network architecture with which the method according to the present invention may be used;

FIG. 2 is a representation of a media table used with the present invention;

FIG. 3 is a representation of a user screen interface of a preferred embodiment of viewing software implementing the present invention;

DETAILED DESCRIPTION OF THE INVENTION

Figure 4:
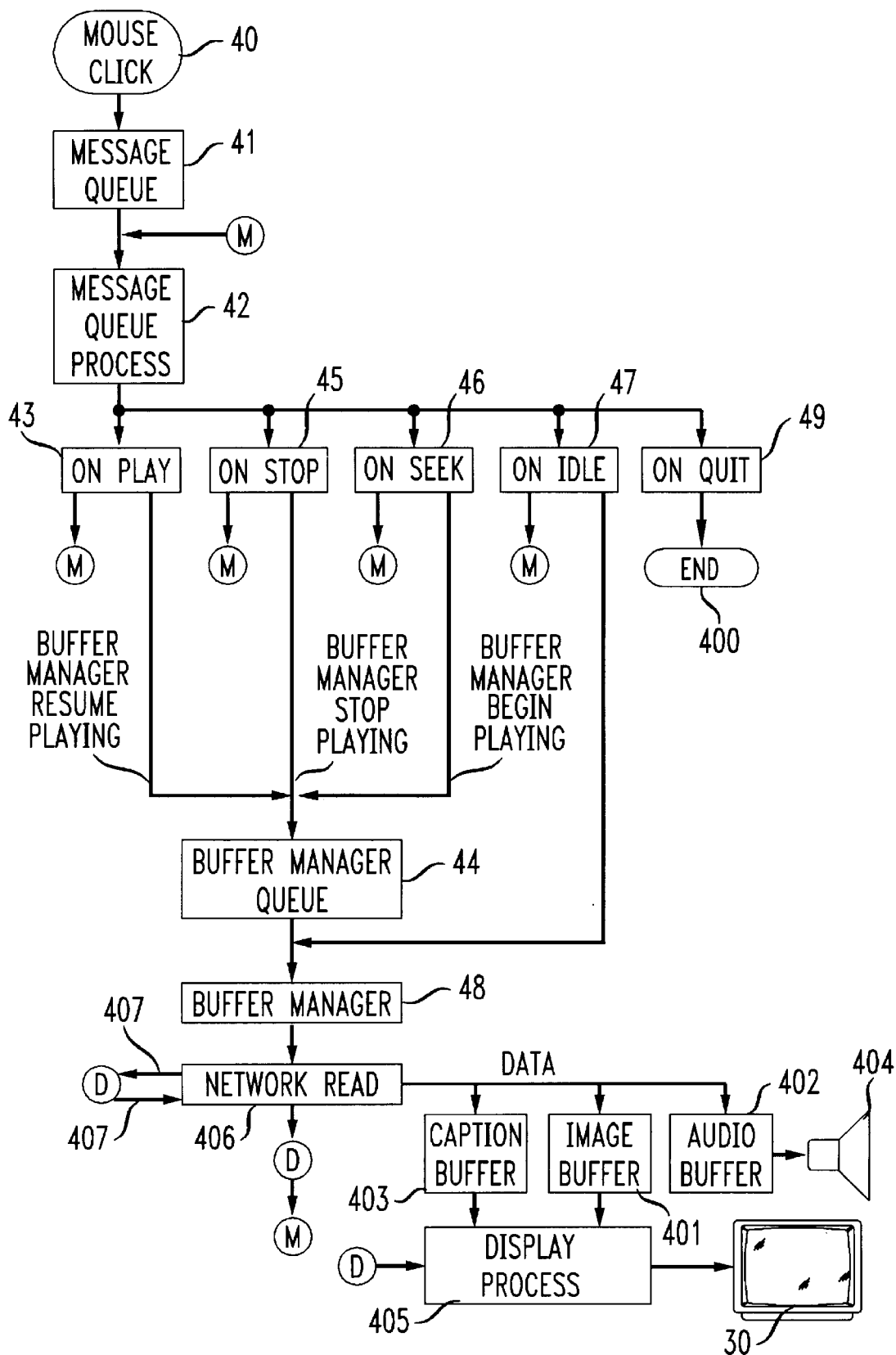
FIG. 4 is a flow diagram showing operation of the viewing software of FIG. 3.

The present invention is implemented in the form of a viewer that allows a user to view programs that are compressed in the manner described above and transmitted across a low-bandwidth network to the user's computer. The viewer of the invention allows the user to view the selected frames of a program in order as they are transmitted, and to hear the corresponding audio channel. If the program is closed-captioned, the closed captioning preferably is also displayed in a separate portion of the viewer display (rather than overlaid on the video image as in the case of television receiver equipped with a closed captioning decoder). In accordance with the compression method described above, the closed captioning data may be manipulated to increase its readability (e.g., while broadcast closed captioning is traditionally all in upper case letters, the closed captioning data here may be converted to lower case letters with capitalization where appropriate). In addition, the user can, substantially at any time, browse ahead in the program and see representative video frames from any portion of the program.

These results, and particularly the ability to scroll through the entire program and view any portion, could be achieved, of course, by downloading to the user station the entire compressed program. However, that would be time-consuming and an ordinary user would not be inclined to use such a system. Instead, in the viewer embodying the invention, the audio data and, if used, the closed captioning data, are streamed to the viewer substantially in real time, while the video data stream is downloaded according to the invention.

The downloading of video data is controlled in accordance with a "media table" produced by the known compression scheme referred to above. The media table lists each video frame in the compressed program and, preferably, its temporal offset from the beginning of the program. Frames are downloaded based on requests from the viewer software, rather than simply being downloaded seriatim. First, the viewer software requests sufficient frames, seriatim, to fill a "prefetch" queue sufficient to last for a predetermined pre-fetch duration, so that, before taking care of any browsing the user may want to do, the viewer software has assured that the user can watch the next few seconds or minutes (the pre-fetch duration) of the program. The software continually monitors the status of the pre-fetch queue and returns to download additional frames when the cumulative duration of frames in the queue falls below a threshold.

As long as there are sufficient frames in the pre-fetch queue, the viewer software begins to download advance frames from other portions of the program so that the user can browse ahead in the program. The frames are selected to minimize gaps in the program. Thus, the first advance frame would likely be selected from near the end of the program. The second advance frame would likely be selected from about the middle of the program. The next advance frame would likely be selected from about three-quarters of the way through the program, then one-quarter and so on. In the beginning, then, as the user browsed forward, there would not be much advance video available (the audio preferably can be streamed fast enough for the user to be able to hear audio from the browsed portion of the program), but as time passes, a significant portion of the video will be available for browsing. Again, the primary concern of the viewer software preferably is to maintain the pre-fetch queue of images, with advance loading of video frames taking place in the background as time permits.

The loading of the pre-fetch queue preferably is not merely a serial loading of frames from the media table. Rather, the system preferably monitors the condition of the network connection and adjusts its download requests accordingly. For example, at times of high network demand, the time required to download a frame will increase. If the time increases sufficiently, there may not be time to download the next frame before the audio track has advanced to a subsequent frame. In such a situation, the system software preferably would "know" to skip a frame. Similarly, network performance would determine whether or not there was sufficient time to stop loading frames into the pre-fetch queue and start loading advance frames. If the time required to load a frame were too long, the system might not load an advance frame as readily; for example, the duration of the pre-fetch queue, and thus the number of frames to be pre-fetched, may be increased.

The particular frames selected for advance loading could be based solely on their temporal locations, but could also be based on other attributes, which may, e.g., be content based. The other attributes could be determined in advance, or could be based on user input through the user interface of the viewer software, or both. For example, while frames are selected from the original uncompressed program based on scene changes, the advance frame loading may be designed to favor certain kinds of scene changes over others—e.g., true scene changes may be preferred for advance loading over so-called "camera-induced" scene changes, viz., scene changes resulting from camera manipulation (such as panning or zooming) of an otherwise substantially unchanging scene. If such attributes are to be used, they would have to be included in the media table.

Viewer software embodying the present invention optionally, but preferably, also includes the ability to display a secondary image stream, preferably in a different portion of the viewer screen than the primary video images. Such secondary images might be, for example, advertising which appears periodically (regularly or irregularly) throughout the program, and which might be geared to the particular scene being displayed at the time in the primary image area. For example, if a particular product is being used by a character in the program, an advertisement for that product might appear. Alternatively, advertising geared to the particular user may appear. Or general advertising may appear. In any case, the secondary image data stream would have to be downloaded with its own media table which directed the viewer software when to display which image.

Both the primary and secondary media tables could be "dynamic"—i.e., they could be downloaded in pieces "on the fly". Practically speaking, this could be implemented by having one of the entries in the first portion of the table be the address for a further portion to be downloaded. This has the advantage of speeding up the initial download of the program to be viewed, at the expense of being able as quickly to pre-load frames from later portions of the program. With respect to the secondary image stream, the dynamic media table could be used to implement advertising targeted to the viewer. For example, the secondary media table downloaded initially with the program might at a particular point instruct the viewer software to download an advertisement, but the address in the table that ostensibly points to the advertisement may be the address of another table that is customized to the user, with that other table pointing to the actual advertisement.

According to another aspect of the invention, an audio-visual program compressed as described above can be small enough to store on a removable data storage medium such as a conventional 3.5' floppy diskette having a capacity of 1.44 megabytes. This is achieved by discarding the audio data stream. It has been found that a one-hour closed-captioned television program compressed as discussed above, and with its audio track discarded, can fit on a 1.44-megabyte floppy diskette. Such a program can then be carried by a user for viewing, using a viewer according to the present invention, at remote locations on a laptop computer or other portable device. For example, the program could be viewed while traveling on an airplane. While the user would not be able to listen to the audio track, he or she could view the representative frames and read the closed captions. In an airplane environment or other public locations, use of the closed captions rather than the audio track has the added benefit of not disturbing fellow passengers.

This additional aspect of the invention makes clear that the term "audiovisual", as used herein, refers to a program that has a video component, and one or both of an audio component and a closed captioning component. Thus, there might be no audio in the audiovisual program.

The invention will now be described with reference to FIGS. 1–9.

Methods according to the present invention may be used in any environment in which an audiovisual program is transmitted from a source to a user station over a transmission medium having insufficient bandwidth to transmit the complete program (i.e., the program with all of its video frames present), even with compression, in real time. The invention may conveniently be described in the context of the architecture shown in FIG. 1, in which the audiovisual program is transmitted from a server 11, where the program is stored in storage media 12, over a low-bandwidth network 10 to a user's client station 13, which may be, for example, a personal computer.

As stated above, low-bandwidth network 10 could be any network having insufficient bandwidth to transmit an audiovisual program with all of its video frames, even with compression, in real time. While the bandwidth limitation could be inherent in the network itself, it is intended that the phrase "low-bandwidth network" encompass even networks such as the Internet, which rely on high-speed links, including fiber-optic links, that have high intrinsic bandwidth, but to which users are typically connected by connections that limit the effective speed or bandwidth. Even the best current telephone modems, for example, connect at speeds of at most 28,800 or 33,600 bits per second, which effectively make the Internet a low-bandwidth network for users of such modems.

The user's client station 13, when using software embodying the current invention, allocates in its working memory 14 a buffer 140 for holding the media tables referred to above, as well as buffers 141, 142, 143 for holding, respectively, the video, closed captioning and audio portions of a received program. The media table or tables stored in buffer 140 may have any suitable format. One sample format 20, shown in FIG. 2, has four "columns" 21, 22, 23, 24. Each entry in column 21 would contain the identifier of a particular video image. Each respective row would thus contain information regarding that particular image. Column 22, for example, would indicate the temporal offset for the image—i.e., the time, measured from the beginning of the program, at which the image is first displayed. This assures that the image is correctly correlated to the audio track, which preferably begins substantially continuous playback at a temporal offset of zero. The image will remain displayed until the temporal offset of the next image is reached, at which point that new image, assuming it is available (i.e., there was no network difficulty that prevented its retrieval), would be displayed. If the new image is not available, then preferably the current image remains displayed until the new image can be retrieved, or until the temporal offset for still another image is reached. Alternatively, a blank screen or an error message, such as "VIDEO NOT AVAILABLE AT THIS TIME" may be displayed.

Column 23 identifies the closed captioning data, if used, that should be displayed with a particular image. However, because a particular video frame may be associated with several frames of closed captioning data, a separate table may be used, and column 23 could be omitted.

Column 24 could include data regarding various image attributes. For example, as discussed above, an indication of the type of scene change that resulted in selection of the image might be included to enable the software implementing the invention to determine whether or not to load that frame in advance of certain other frames.

Other data may be included in table 20, and certain of the data described may be omitted, according to the needs of the particular implementation of the invention, as would be apparent to those of ordinary skill.

A preferred embodiment of a viewer interface 30 in accordance with the invention is shown in FIG. 3, although other viewer interface configurations may also be used. Interface 30 is preferably implemented using a standard graphical user interface such as Microsoft WINDOWS™, and thus has certain standard elements such as title bar 31 and menu bar 32. An image area 33 is provided for the display of the video images of the audiovisual program. Area 34 is provided for the display of the secondary images discussed above (e.g., advertising). Area 35 is provided for the display of closed captioning data. While area 33 would probably, but not necessarily, have a visible boundary even when no image was being displayed there, areas 34 and 35 probably would not have visible boundaries.

Interface 30 also preferably has two slide controls 36, 37. Slide control 36 preferably controls the volume of the audio portion of the program when played back. Slide control 37 preferably allows the user to scroll to a different portion of the program. Slide control 37 thus preferably would move, on its own, as the program progressed, to indicate the current position in the program. Preferably, indicia (not shown) are displayed along the paths of slide controls 36, 37 to indicate their functions and their levels or positions. Slide controls 36, 37 are preferably actuated by the user using a mouse or similar pointing device that controls a displayed pointer 38. Buttons 39 may be provided for functions such as PLAY, STOP, SEEK and QUIT. Other functions may be available to the user using pointer 38, either through other graphical controls (not shown) in other areas of viewer 30, or through menu items on menu bar 32 (which may also have keystroke equivalents accessible from the keyboard of the user station).

FIG. 4 shows the operational flow of software implementing the viewer embodying the invention. The system accepts mouse clicks or similar inputs at 40. Depending on where on the screen the mouse is clicked, a different message will be sent into message queue 41 which ultimately is processed in message queue processing stage 42. If the message is a play message (at 43), the system sends a "Resume Playing" message to the buffer manager queue 44 and then returns to wait for additional messages. If the message is a stop message (at 45), the system sends a "Stop Playing" message to the buffer manager queue 44 and then returns to wait for additional messages. If the message is a seek message (at 46), the system sends a "Resume Playing" message to the buffer manager queue 44 and then returns to wait for additional messages. If there are no new messages—i.e., there is an idle condition (at 47), the system continues to monitor for new messages while buffer manager 48 continues to process the messages in buffer manager queue 44. The system continues until a "Quit" message is received (at 49), causing the process to end at 400.

Buffer manager 48 manages the capture of data into image, audio and caption buffers 401, 402, 403, as well as the playback of that data, in response to user requests. If the user requests that a program be played, buffer manager 48 examines the contents of buffer 401 to determine whether or not the desired video material is present there (the audio and closed captioning data preferably are streamed substantially in real time, with only a slight delay). If the content is in buffer 401, the corresponding audio from buffer 402 is played through speaker 404, while the video and closed caption data are played through interface 30 using display process 405. Buffer manager 48 continues to perform network read function 406 to load advance frames. At the same time, the system continues to monitor for user input into message queue 41.

If the video content to be played is not in buffer 401, the audio and closed captioning data continue to be played from buffers 402, 403 while the network read process 406 loads the necessary video frames. As shown by arrows 407, when the system is operating in this mode, buffer manager 48 continually alternates between display process 405 and network read function 406.

Figure 5:
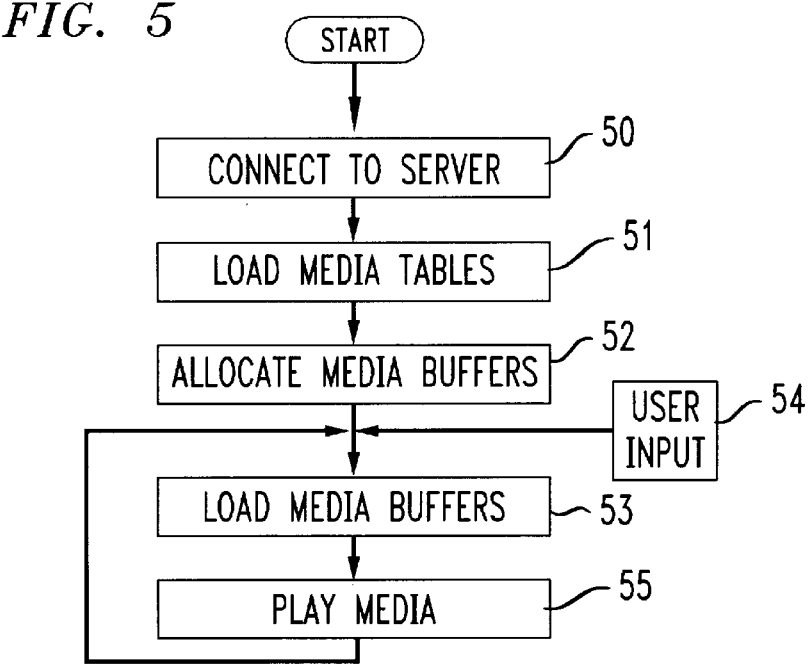
FIG. 5 is a flow diagram showing a preferred embodiment of the method of the present invention.

The flow of the method according to the invention is diagrammed in FIG. 5. At step 50, the user causes the system to connect to the server that hosts the program to be downloaded. At step 51, the system first downloads the media tables associated with the program, and uses those tables at step 52 to allocate sufficient memory to buffer the program. At step 53, the system loads the media buffers with the data to be played, optionally under the partial control of user input 54 as discussed above. At step 55, the data are played and the system returns to load additional data at step 53.

Figure 6:
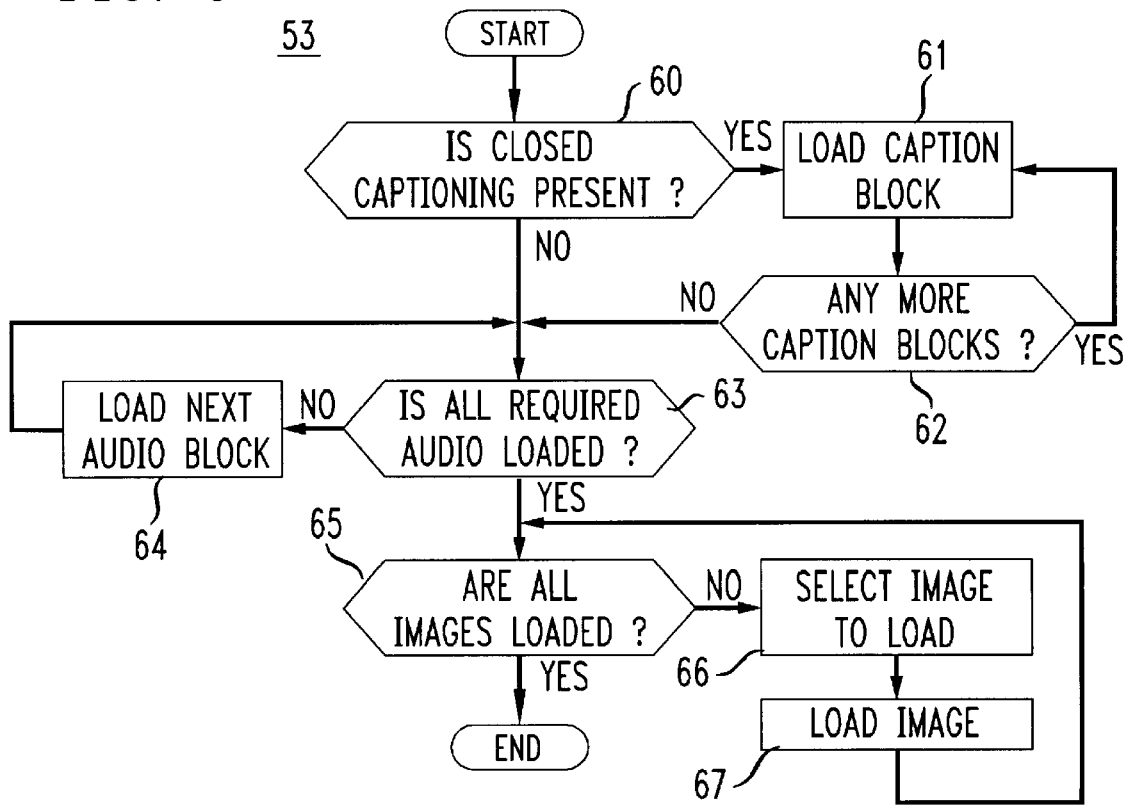
FIG. 6 is a flow diagram showing a preferred buffer loading scheme according to the present invention.

FIG. 6 shows, in expanded form, a preferred embodiment of the media buffer loading step 53 of FIG. 5 for each play period (preferably about 8 seconds). At test 60, the system determines from the media tables whether or not closed captioning is present in the program in question. If there is closed captioning, the system proceeds to step 61 where a block of closed captioning data is loaded. Next, the system tests at 62 to see if there are any more closed captioning data blocks to be loaded for this play period (the system knows from the media tables how many blocks there are). If there are more caption blocks, the system loops back to step 61. If there are no more caption blocks, or if at test 60 there is no closed captioning present, the system proceeds to test 63 to determine whether or not all of the audio indicated by the media tables has been loaded for this play period (the first time test 63 is reached, the answer will clearly be "no"). If all of the audio for this play period has not been loaded, the system proceeds to step 64 to load the next audio block, and then loops back to test 63. Once it is determined at test 63 that all audio for the play period has been loaded, the system proceeds to test 65 to determine whether or not all video images for the play period have been loaded (again the answer will be "no" the first time the test is encountered). If all images for the play period have not been loaded, the system proceeds to step 66 where the next image to be loaded is selected from the media tables, and then the selected image is loaded at step 67 and the system loops back to test 65. Once test 65 determines that all images for the play period have been loaded, the loading process ends at 68. While FIG. 6 shows the loading of closed captioning data before audio data, audio data could be loaded first. However, video data will preferably be loaded last.

Figure 7:
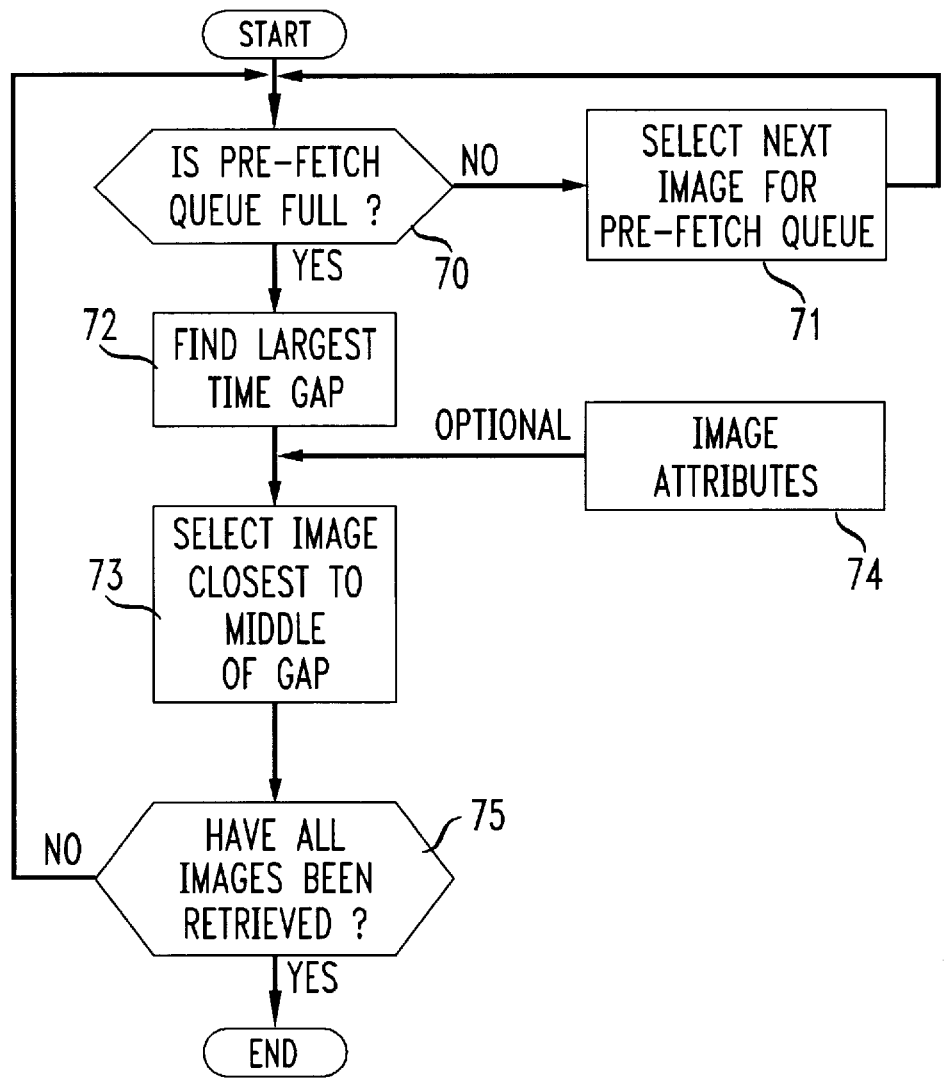
FIG. 7 is a flow diagram showing detail of a preferred embodiment of the image selection routine of the buffer loading scheme of FIG. 6.

FIG. 7 shows, in expanded form, a preferred embodiment of the image selection step 66 of FIG. 6. At test 70, the system checks to see if it has sufficient images to fill the pre-fetch queue. If not, then at step 71, the system requests from the server the next image to be displayed that has not yet been downloaded. If at test 70 the system determines that the pre-fetch queue is full, then at step 72 the system finds the largest time gap in the images it has downloaded from the remainder of the program, and at step 73 it requests the image closest to the middle of that gap. The selection of image for step 73 might be adjusted based on image attributes input at 74 based on a predetermined profile or on user inputs entered in advance. As a result, the image selected might not be the very closest one to the middle of the gap, but rather one of the closest ones, also meeting the defined attributes. At test 75, the system checks to see if has received all of the images identified in the media tables. If it has, execution of step 66 ends; otherwise the system loops back to test 70 and execution of step 66 continues.

Figure 8:
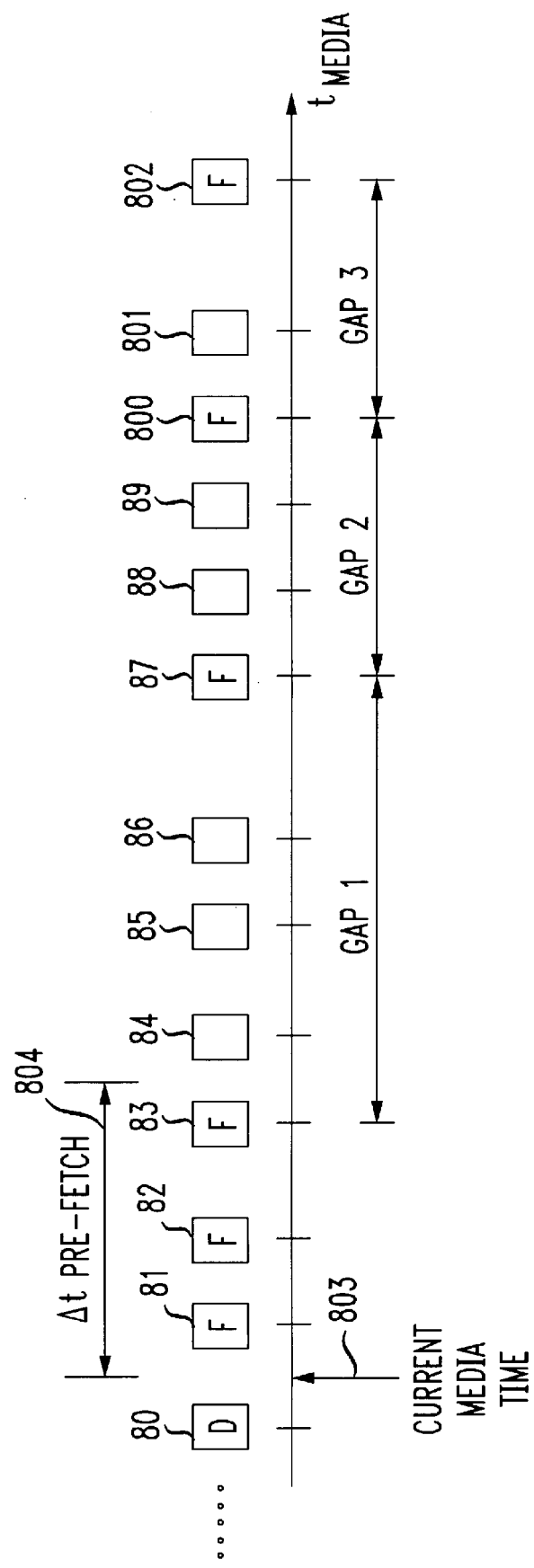
FIG. 8 is a schematic representation of the contents of an image buffer loaded in accordance with the image selection routine of FIG. 7.

FIG. 8 is a schematic representation of the image portion of a program in the process of being downloaded for viewing. Each of boxes 80–89 and 800–802 represents a frame that is identified in the media table for the program. The frames are displayed along an axis representing time advancing to the right. The diagram is drawn to show a program in the process of being viewed, with the current time indicated at 803. Thus frame 80 has already been displayed, as indicated by a "D" in the box representing the frame. Of the other frames, those with "F" in the box represent frames already downloaded but not yet viewed, while those that are blank have not yet been downloaded.

The pre-fetch duration is represented at 804. The first priority of the method according to the invention is to load all frames that must be displayed within pre-fetch duration 804, and as seen, frames 81–83, which fall in that period, have already been loaded and make up the pre-fetch queue. Once frame 81 has been displayed, the system will need to download frame 84 to keep up the pre-fetch queue, although, as discussed above, if network conditions are poor, the system may skip over frame 84, continuing to display frame 83 until frame 85 can be downloaded, or displaying a blank screen or error message.

Of the remaining frames, frame 802 represents the last frame in the program, and it has already been downloaded. In addition, frame 87, closest to the middle of the gap between the end of the pre-fetch queue and the end of the program, has been loaded, as has frame 800, about midway between frame 87 and the end of the program. The remaining gaps are those indicated as GAP1, GAP2 and GAP3. Of those, GAP1 is the largest, so according to the invention the next frame to be loaded should be frame 85, at about the middle of GAP1, although user or program preferences for particular types of images (e.g., true scene changes over camera-induced scene changes), might result in frame 86 being loaded first.

If the user decides to scroll ahead in the program, in the preferred embodiment he or she will hear the correct audio and see the correct closed captioning (if provided), as those preferably can be streamed to the viewer substantially in real time. However, depending on how many images have been loaded, the user may not see the correct image. Instead, either the closest image to the time point selected, or alternatively, the closest image preceding the point selected, will be displayed, depending on the particular implementation of the method of the invention.

The implementation may depend on the type of program being viewed. For example, in the case of a television talk show with several participants, ideally one would want to show the correct face with the correct speaker. Without sending additional information, it may be difficult to know, for any point in the audio selected in real time by the user, which of the images already loaded shows the correct face. Therefore, the preference for downloading advance images might be set to load long shots of the entire group, rather than individual close-ups. Alternatively, the viewer can be set up to display a blank screen or an error message.

In another embodiment, the media table could include for some or all frames an indication that that frame is similar to a previous frame, and the system would know to display that previous frame if it were unable to load the correct frame in time. In yet another embodiment, the media table could include voice print information for each participant in a talk show, and then if the video image is not available, the current audio can be analyzed and a previously loaded video image having voice print information in the media table that matches the analysis of the current audio could be displayed.

The invention thus allows a user to view an audiovisual program downloaded over a low-bandwidth network, with the freedom to browse through the program in real time even before it is fully downloaded. Of course, once the complete compressed program is fully downloaded, the user can scroll through the program and see the intended image with the selected audio.

Although the invention achieves its greatest advantage in the context of a low-bandwidth network as described above, the invention can be used even in a network with high enough bandwidth to transmit full-motion video, to facilitate scrolling. Previously known full-motion video networks would require several seconds to fill the required buffers before resuming playback after a scroll by the user, during which time the user sees a blank screen. The present invention could be used to retrieve representative frames from different parts of the program, so that during scrolling, the user would see those frames, which could be a guide to selecting an interesting program segment to view.

While the invention has been described in connection with the primary video stream, similar techniques can be used to download the secondary video stream.

In accordance with another aspect of the invention, a user can download a program to a removable medium such as a floppy diskette with a capacity of 1.44 megabytes. In that aspect of the invention, the program is downloaded with images and closed captioning, but without audio. For while the entire video portion of a program includes significantly more data than either the audio or closed captioning portions, deleting the audio portion of a program compressed as set forth in the above-identified copending application frees up the right amount of capacity to allow storage of the program on a floppy diskette. Viewer software operating in accordance with this invention can be used to view the program on, e.g., a portable computer in places such as airplanes, trains, etc.

Figure 9:
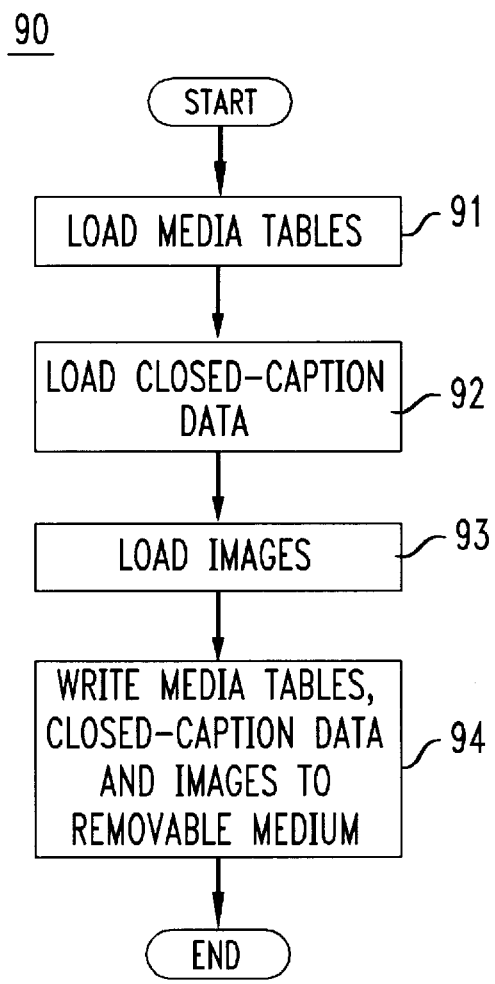
FIG. 9 is a flow diagram of a method according to the invention of storing an audiovisual program on a removable medium for viewing at a remote location.

The method according to this aspect of the invention is diagrammed in FIG. 9. At step 91, the media tables for the program are downloaded. Next, at step 92, based on the data in the media tables, the system requests, from the server, the closed captioning data for the program. Again using the media table data, the system at step 93 requests, from the server, the image data. At step 94, the images and closed captioning data are written to a removable storage medium along with the media tables, which are used by the viewer to associate the correct image with the correct closed caption during playback. In this aspect of the invention, the user has full scrolling capability, as all of the compressed program is downloaded prior to viewing.

Thus it is seen that a technique for viewing compressed audiovisual programs, as they are being transmitted, while allowing the user to scroll through the entire program before downloading is completed, has been provided. One skilled in the art will appreciate that the present invention can be practiced by other than the described embodiments, which are presented for purposes of illustration and not of limitation, and the present invention is limited only by the claims which follow.

What is claimed is:

1. A method for receiving an audiovisual program at a station of a communications network and playing back said program at said station, said audiovisual program having content comprising a video data stream, said video data stream being transmitted in a compressed format in which frames determined to have greater significance than other frames are retained and frames determined to have lesser significance than other frames are discarded, said program further being accompanied by a table indicating which frames are present in said compressed program and a time offset at which display of each frame is to begin, said method comprising the steps of:

establishing a pre-fetch interval;

requesting, at said station, transmission by said network of data to fill a pre-fetch queue having a duration commensurate with said pre-fetch interval;

when said pre-fetch queue is full, requesting, at said station, transmission by said network of additional data from later portions of said program.

2. The method of claim 1 wherein said step of requesting additional data comprises:

examining said table; and selecting, for request, data referenced in said table as a function of which portion of said program said data originate in.

3. The method of claim 2 wherein said selecting step comprises:

analyzing at least one of
  (a) performance of said communications network, and
  (b) availability of data previously requested from different portions of said program; and choosing data, for request, based on said analysis.

4. The method of claim 1 further comprising the steps of:

playing back contents of said pre-fetch queue; and as said contents of said pre-fetch queue are played back, requesting, at said station, transmission by said network of data to maintain said pre-fetch queue.

5. The method of claim 4 further comprising accepting, at substantially any time, user input for selecting playback of one of said later portions of said program.

6. The method of claim 1 wherein said audiovisual program comprises at least one other data stream.

7. The method of claim 6 wherein said at least one other data stream comprises audio data.

8. The method of claim 6 wherein said at least one other data stream comprises closed-captioning data.

9. A method of communicating audiovisual programs over a communications network, and playing back said programs at a station of said network, said method comprising the steps of:

analyzing content of said audiovisual program;

compressing said audiovisual program as a function of said content to create a compressed program;

compiling a table indicating which portions of said program are present in said compressed program and transmitting said table over said network in association with said compressed program;

examining said table at said station; and selecting at said station, for request from said network, data referenced in said table as a function of which portion of said program said data originates in.

10. The method of claim 9 wherein:

said audiovisual program comprises audio data and video data; and said compressing step comprises compressing said video data and transmitting said audio data in a substantially real-time stream.

11. The method of claim 10 wherein said compressing step comprises compressing said video data by analyzing significance of frames, retaining frames expected to have greater significance than other frames, and discarding frames expected to have lesser significance than other frames.

12. The method of claim 11 wherein said step of analyzing significance of frames comprises examining frames for one of (a) a scene change relative to adjacent frames, (b) a fade, and (c) a change in volume level of audio associated with said frame relative to audio associated with adjacent frames.

13. The method of claim 11 further comprising:

compiling a table indicating which frames are present in said compressed program and a time offset at which display of each frame is to begin; and transmitting said table as part of said compressed program.

14. The method of claim 13 further comprising compressing said table prior to said transmitting step.

15. The method of claim 14 wherein said table compressing step comprises transmitting portions of said table at different times.

16. The method of claim 9 further comprising transmitting a second visual program along with said audiovisual program.

17. The method of claim 16 wherein said transmitting step comprises:

compiling a table indicating which frames are present in said second visual program and a time offset at which display of each frame is to begin; and transmitting said table as part of said second visual program.

18. The method of claim 9 wherein said selecting step comprises, at said station:

establishing a pre-fetch interval;

requesting, at said station, transmission by said network of data to fill a pre-fetch queue having a duration substantially equal to said pre-fetch interval;

when said pre-fetch queue is full, requesting, at said station, transmission by said network of additional data from later portions of said program.

19. The method of claim 18 wherein said step of requesting additional data comprises:

examining said table; and selecting, for request, data referenced in said table as a function of which portion of said program said data originate in.

20. The method of claim 19 wherein said selecting step comprises:

analyzing at least one of
  (a) performance of said communications network, and
  (b) availability of data previously requested from different portions of said program; and choosing data, for request, based on said analysis.

* * * * *